United States Patent [19]

Kunieda et al.

[11] Patent Number: 4,963,608
[45] Date of Patent: Oct. 16, 1990

[54] HALOGEN-CONTAINING THERMOPLASTIC RESIN COMPOSITION

[75] Inventors: Makoto Kunieda, Hirakata; Hiroshi Takida, Takatsuki, all of Japan

[73] Assignees: Nippon Gohsei Kagaku Kogyo Kabushiki, Osaka; Kyowa Kagaku Kogyo Kabushiki Kaisha, Takamatsu, both of Japan

[21] Appl. No.: 288,905

[22] Filed: Dec. 23, 1988

[30] Foreign Application Priority Data

Dec. 29, 1987 [JP] Japan .................. 62-336191

[51] Int. Cl.$^5$ .......................... C08K 5/04; C08K 3/18; C08L 27/00
[52] U.S. Cl. ..................... 524/394; 524/399; 524/424; 524/432; 524/436; 524/567
[58] Field of Search ............... 524/432, 436, 399, 424, 524/395, 394

[56] References Cited

U.S. PATENT DOCUMENTS 4,675,356 6/1987 Miyata .................. 524/399

FOREIGN PATENT DOCUMENTS 52-69955 6/1977 Japan .
0238345 11/1985 Japan .

Primary Examiner—Joseph L. Schofer
Assistant Examiner—Mark Sweet
Attorney, Agent, or Firm—Armstrong, Nikaido, Marmelstein, Kubovcik & Murray

[57] ABSTRACT

A halogen-containing thermoplastic resin composition comprising a halogen-containing thermoplastic resin (A), a metal soap (B), an ethylene-vinyl acetate copolymer hydrolysate (C), and a hydrotalcite type solid solution (D) of the general formula

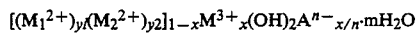

$$[(M_1^{2+})_{y_1}(M_2^{2+})_{y_2}]_{1-x}M^{3+}{}_x(OH)_2A^{n-}{}_{x/n}\cdot mH_2O$$

wherein $M_1^{2+}$ is a metal selected from the group consisting of Mg, Ca, Sr and Ba, $M_2^{2+}$ is a metal selected from the group consisting of Zn, Cd, Pb and Sn, $M^{3+}$ is a trivalent metal, $N^{n-}$ is an anion having a valence of n and x, y1, y2 and m are positive numbers in the ranges of $0 < x \leq 0.5$, $0.5 < y1 < 1$, $0.5 < y2 < 1$ and $0 \leq m < 2$, respectively, the proportions of (B), (C) and (D) based on 100 parts by weight of (A) being 0.1 to 5 parts by weight, 0.1 to 5 parts by weight and 0.01 to 5 parts by weight, respectively.

8 Claims, No Drawings

HALOGEN-CONTAINING THERMOPLASTIC RESIN COMPOSITION

BACKGROUND OF THE INVENTION

The present invention relates to a halogen-containing thermoplastic resin composition with improved stability against initial coloration, discoloration on aging and blackening.

The halogen-containing thermoplastic resin, represented by polyvinyl chloride resin, gives rise, on heating for melt-molding purposes, to a polyene structure with elimination of hydrochloric acid, undergoing yellowing. To enhance the thermal stability of the resin, it has been common practice to incorporate a metal soap as a stabilizer in the resin. However, since the incorporation of a stabilizer metal soap alone may lead to the so-called metal buring in a prolonged melt-molding process, which causes blackening of the resin, it has been generally practiced to add an auxiliary stabilizer, such as polyols (e.g. pentaerythritol), organic phosphorous esters (e.g. triphenyl phosphite), epoxy compounds (e.g. bisphenol A type epoxy resin) and so on.

Aside from the above-mentioned technology, Japanese Unexamined Patent Application KOKAI 238345/1985 discloses a material sharing with the present invention some of resin components, although the prior art is not intended to enhance the thermal stability of halogen-containing thermoplastic resin.

Thus, the above-mentioned patent literature describes a resin composition consisting of (a) a thermoplastic resin (inclusive of polyvinyl chloride resin), (b) an ethylene-vinyl acetate copolymer hydrolysate, and (c) a salt or oxide containing at least one element selected from Groups I, II and III of Periodic Table of the Elements and mentions that this composition assures a marked improvement in compatibility.

In addition, Japanese Unexamined Patent Application KOKAI 69955/1977 discloses a polyvinyl chloride barrier packaging composition consisting essentially of a mixture of polyvinyl chloride and 10 to 30 weight percent, based on polyvinyl chloride, of an ethylenevinyl alcohol copolymer which shares some resin components with the composition of the present invention.

However, the use of a metal soap as a stabilizer in combination with an auxiliary stabilizer has the disadvantage that where the auxiliary stabilizer is a polyol, the resulting composition is inadequate in compatibility and dispersibility so that the plate-out phenomenon (sticking of the batch to the roll) in the roll mixing stage is inevitable, that where the auxiliary stabilizer is an organic phosphorous ester, it is hydrolyzed on absorption of moisture to lose its expected effect in part, and that where an epoxy compound is used as the auxiliary stabilizer, yellowing and plate-out cannot be sufficiently inhibited.

The composition described in Japanese Unexamined Patent Application KOKAI 238345/1985 is claimed to offer improved compatibility but has room for improvement in thermal stability.

The composition described in Japanese Unexamined Patent Application KOKAI 69955/1977 is conducive to reduced oxygen permeability with suppression of water vapor permeation but is poor in melt-moldability and in prevention of discloration, thus being of no great use in practical applications. Furthermore, since this composition inclusives relatively high content of ethylene-vinyl alcohol copolymer, the inherent characteristics of polyvinyl chloride resin are not available, thus delimiting its range of application.

The present invention has been accomplished to provide a halogen-containing thermoplastic resin composition having markedly improved thermal stability.

SUMMARY OF THE INVENTION

The present invention relates to a halogen-containing thermoplastic resin composition comprising a halogen-containing thermoplastic resin (A), a metal soap (B), an ethylene-vinyl acetate copolymer hydrolysate (C) having an ethylene content in the range of 20 to 75 mole percent and a degree of saponification not less than 50 mole percent, and a hydrotalcite type solid solution (D) of the general formula

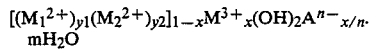

$$[(M_1^{2+})_{y1}(M_2^{2+})_{y2}]_{1-x}M^{3+}{}_x(OH)_2A^{n-}{}_{x/n} \cdot mH_2O$$

wherein $M_1^{2+}$ is a metal selected from the group consisting of Mg, Ca, Sr and Ba, $M_2^{2+}$ is a metal selected from the group consisting of Zn, Cd, Pb and Sn, $M^{3+}$ is a trivalent metal, $A^{n-}$ is an anion having a valence of n and x, y1, y2 and m are positive numbers in the ranges of $0 < x \leq 0.5$, $0.5 < y1 < 1$, $0.5 < y2 < 1$ and $0 \leq m < 2$, respectively, the proportions of (B), (C) and (D) based on 100 parts by weight of (A) being 0.1 to 5 parts by weight, 0.1 to 5 parts by weight and 0.01 to 5 parts by weight, respectively.

DETAILED DESCRIPTION OF THE INVENTION

The present invention is described in detail below.

Halogen-containing thermoplastic resin (A)

As examples of halogen-containing thermoplastic resin (A), there may be mentioned polyvinyl chloride resin, polyvinylidene chloride resin, chlorinated polyethylene, chlorinated polypropylene, chlorinated ethylene-vinyl acetate copolymer and chlorosulfonated polyethylene. Particularly useful are polyvinyl chloride type resins, i.e. vinyl chloride homopolymer and copolymers of vinyl chloride with other comonomers.

Metal soap (B)

As examples of metal soap (B), there may be mentioned Group II metals salts of higher fatty acids, resin acid, naphthenic acid and so on. As Group II metals, there may be mentioned magnesium, calcium, strontium, barium, zinc, cadmium and so on. Particularly useful are the salts of higher fatty acids, such as stearic acid, lauric acid, ricinolic acid, etc., with zinc, magnesium, calcium, barium, or cadmium. Particularly, the zinc salts are especially effective and, therefore, it is preferable to use a higher fatty acid zinc salt at least in part. Moreover, while the metal soaps mentioned above can be used singly, a greater stabilizing effect can be achieved by using two or more of them in combination.

Ethylene-vinyl acetate copolymer hydrolysate (C)

As the aforesaid ethylene-vinyl acetate copolymer hydrolysate (C), a copolymer having an ethylene content of 20 to 75 mole percent and a degree of saponification of its vinyl acetate unit not less than 50 mole percent is used.

Any ethylene-vinyl acetate copolymer hydrolysate whose composition is outside of the above range is insufficient to provide the desired degree of improvement in the thermal stability of halogen-containing thermoplastic resin (A). It should be understood that provided the copolymer hydrolysate composition is not deviant from the aforesaid range, (A) may include other comonomer units in a small proportion.

The ethylene-vinyl acetate copolymer hydrolysate (C) can generally be prepared by hydrolyzing (saponifying) an ethylene-vinyl acetate copolymer with the aid of an alkali catalyst. However, the industrial water and reagents used generally contain metal salts as impurities and the saponification catalyst (an alkali metal hydroxide) remains as the alkali metal acetate after the reaction, with the result that such impurities and alkali metal acetate tend to be contained in the saponified copolymer separated by precipitation or filtration from the saponification reaction mixture. Though it depends on various factors such as the ethylene content of the resin, degree of saponification, conditions of saponification reaction, etc., the ash and alkali metal contents of the ethylene-vinyl acetate copolymer hydrolysate so obtained are usually about 5,000 to 50,000 ppm and about 4,000 to 40,000 ppm, respectively.

The terms 'ash content' are used herein to mean the value found as follows. The ethylene-vinyl acetate copolymer hydrolysate is dried, taken in a platinum evaporating dish and carbonized by means of an electric heater and a gas burner. The dish containing carbonized resin is then placed in an electric furnace at 400° C. The furnace temperature is then increased to 700° C., at which temperature it is thoroughly reduces to ashes over 3 hours. The dish containing ashes is taken out from the furnace, allowed to cool over 5 minutes and further allowed to stand in a desiccator for 25 minutes. Finally, the ashes were accurately weighed.

The terms 'alkali metal content' are used herein to mean the value found as follows. After the ethylene-vinyl acetate copolymer hydrolysate is reduced to ashes as in the determination of ash content, the ashes are dissolved in an aqueous solution of hydrogen chloride under warming and the solution is subjected to atomic absorption spectrometry.

The ethylene-vinyl acetate copolymer hydrolysate (C) to be used in accordance with the invention preferably has an ash content, as determined by the above procedure, not more than 300 ppm, more desirably not more than 50 ppm, and for still better results not more than 20 ppm and an alkali metal content, also as determined by the above-described procedure, not more than 200 ppm, more desirably not more than 35 ppm, and for still better results not more than 5 ppm. The lower is the ash content and the alkali metal content, the more pronounced is the effect on thermal stability, particularly in terms of prevention of initial coloration. The ash and alkali metal contents are preferably as low as possible within the respective ranges mentioned above but because of various limitations imposed on purification in commerical production, the practical lower limits are about 1 ppm for ashes and about 0.5 ppm for alkali metal.

The aforementioned ash- and alkali metal-lean ethylene-vinyl acetate copolymer hydrolysate (C) can be prepared as follows. The powders, granules or pellets of ethylene-vinyl acetate copolymer hydrolysate obtained by said saponification reaction are washed thoroughly with an aqueous solution of acid, preferably a weak acid, to remove the salt responsible for said ashes and alkali metal and are then preferably rinsed with water to remove the absorbed acid from the resin and dried.

The water, aforementioned and undermentioned, used for preparation of aqueous solution of acid and rinsing, is deionized water.

As examples of the weak acid mentioned above, there may be employed acetic acid, propionic acid, glycolic acid, lactic acid, adipic acid, azeleic acid, glutaric acid, succinic acid, benzoic acid, isophthalic acid, terephthalic acid and so on. Generally, a weak acid with a pKa value not less than 3.5 at 25° C. is preferred.

After the above weak acid treatment and either before or after rinses with water, there is preferably carried out a further treatment with a dilute aqueous solution of strong acid, for example an organic acid with a pKa value not exceeding 2.5° to 25° C., such as oxalic acid, maleic acid, etc., or mineral acids such as phosphoric acid, sulfuric acid, nitric acid, hydrochloric acid and so on. By this strong acid treatment, removal of the alkali metal can be made more effectively.

Compound (D)

Referring to the general formula given hereinabove, Mg and Ca are preferred species of $M_1^{2+}$ and Zn and Cd are preferred species of $M_2^{2+}$. Examples of $M^{3+}$ are Al, Bi, In, Sb, B, Ga and Ti; among them, Al is suited for practical use.

The anion $A^{n-}$ includes, among others, $CO_3^{2-}$, $OH^-$, $HCO_3^-$, salicylate ion, citrate ion, tartrate ion, maleate ion, $NO_3^-$, $I^-$, $(OOC\text{-}COO)^{2-}$ and $[Fe(CN)_6]^{4-}$. Among these, $CO_3^{2-}$ and $OH^-$ are preferred.

The compound (D) may be surface-treated with a higher fatty acid, an anionic surfactant, a silane coupling agent, a titanate coupling agent, a glycerol fatty acid ester, or the like.

Specific examples of such solid solution are:

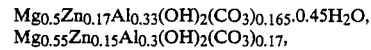
$Mg_{0.5}Zn_{0.17}Al_{0.33}(OH)_2(CO_3)_{0.165}\cdot 0.45H_2O$,
$Mg_{0.55}Zn_{0.15}Al_{0.3}(OH)_2(CO_3)_{0.17}$,

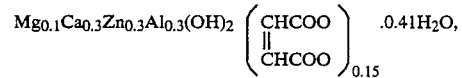
$Mg_{0.1}Ca_{0.3}Zn_{0.3}Al_{0.3}(OH)_2 \left( \begin{array}{c} CHCOO \\ \| \\ CHCOO \end{array} \right)_{0.15} \cdot 0.41H_2O$,

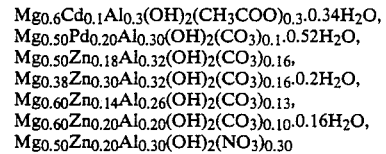
$Mg_{0.6}Cd_{0.1}Al_{0.3}(OH)_2(CH_3COO)_{0.3}\cdot 0.34H_2O$,
$Mg_{0.50}Pd_{0.20}Al_{0.30}(OH)_2(CO_3)_{0.1}\cdot 0.52H_2O$,
$Mg_{0.50}Zn_{0.18}Al_{0.32}(OH)_2(CO_3)_{0.16}$,
$Mg_{0.38}Zn_{0.30}Al_{0.32}(OH)_2(CO_3)_{0.16}\cdot 0.2H_2O$,
$Mg_{0.60}Zn_{0.14}Al_{0.26}(OH)_2(CO_3)_{0.13}$,
$Mg_{0.60}Zn_{0.20}Al_{0.20}(OH)_2(CO_3)_{0.10}\cdot 0.16H_2O$,
$Mg_{0.50}Zn_{0.20}Al_{0.30}(OH)_2(NO_3)_{0.30}$

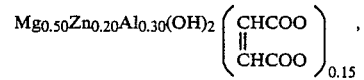
$Mg_{0.50}Zn_{0.20}Al_{0.30}(OH)_2 \left( \begin{array}{c} CHCOO \\ \| \\ CHCOO \end{array} \right)_{0.15}$,

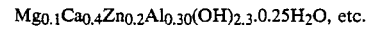
$Mg_{0.1}Ca_{0.4}Zn_{0.2}Al_{0.30}(OH)_{2.3}\cdot 0.25H_2O$, etc.

While the addition, in accordance with the invention, of (B), (C) and (D) to (A) is already effective in producing the desired effects, still more marked effects may be produced when one or more known stabilizers for halogen-containing thermoplastic resins are used additionally.

Thus, the combined use of at least one compound (E) selected from the group consisting of β-diketone compounds, organic phosphorous esters and aminocarboxylic acid compounds can result in marked improvement in the initial coloration preventing effect. Furthermore, addition of at least one compound (F) selected from the group consisting of phenol derivatives and epoxy compounds can lead to marked improvement in the blackening preventing effect. Therefore, the use of at least one compound (E) plus at least one compound (F) is advantageous from the practical viewpoint.

Specific examples of such compounds (E) and (F) are given below.

Compound (E)

The aforesaid β-diketone compounds include, among others, dibenzoylmethane, benzoylacetone, tribenzoylmethane, diacetylacetobenzene, stearoylacetophenone, palmitoylacetophenone, lauroylacetophenone, p-methoxy stearoylacetophenone, stearoylbenzoylmethane, acetoacetic eaters, acetylacetone, 1,1-diacetylacetone, triacetylmethane, stearoylacetone, palmitoylacetone, lauroylacetone, stearoyloctanone, heptane-2,4-dione, decane-2,4-dione, ethyl nonane-2,4-dionecarboxylate, 8-methylnona-7-ene-2,4-dione, 1-benzoyloctan-2-one, 2-methyldecan-2-ene-6,8-dione, methylene-2,2'-bis(cyclohexane-1,3-dione), 1,4-diphenylbutane-1,3-dione, 1-phenyl-2-allyl-1,3-butanedione, benzoylacetaldehyde, 2-methyl-2-acetylacetaldehyde, dehydroacetic acid, and dehydroacetates.

The aforesaid organic phosphorous esters include, among others, triaryl phosphites such as triphenyl phosphite, tris(p-nonylphenyl)phosphite, etc.; alkyl aryl phosphites, for example monoalkyl diphenyl phosphites such as diphenyl isooctyl phosphite, diphenyl isodecyl phosphite, etc. and dialkyl monophenyl phosphites such as phenyl diisooctyl phosphite, phenyl diisodecyl phosphite, etc.; and trialkyl phosphites such as triisooctyl phosphite, tristearyl phosphite and so on.

The aforesaid aminocarboxylic acid compounds include, among others, aminocarboxylic compounds such as glycine, alanine, lysine, triptophan, acetylglutamic acid, acetylphenylalanine, acetylmethionine, pyrrolidonecarboxylic acid, β-aminocrotonic acid, α-aminoacrylic acid, α-aminoadipic acid, etc. and the corresponding esters. The alcohol components of such esters include, among others, monohydric alcohols such as methanol, ethanol, proponal, isopropyl alcohol, butanol, α-ethylhexanol, octanol, isooctyl alcohol, lauryl alcohol, stearyl alcohol, etc. and polyhydric alcohols such as ethylene glycol, propylene glycol, 1,3-butanediol, 1,4-butanediol, glycerol, diglycerol, trimethylolpropane, pentaerythritol, dipentaerythritol, sorbitol, mannitol and so on.

Compound (F)

The aforesaid phenol derivatives include, among others, 2,5-di-t-butylhydroquinone, 2,6-di-t-butyl-p-cresol, 4,4'-thiobis(3-methyl-6-t-butylphenol), 2,2'-methylenebis(4-metyl-6-t-butylphenol), tetrakis[methylene-3-(3',5'-di-t-butyl-4'-hydroxyphenyl)propionate]methane, octadecyl 3-(3',5'-di-t-butyl-4'-hydroxyphenyl)propionate, 4,4'-thiobis(6-t-butylphenol), N,N'-hexamethylenebis(3,5-di-t-butyl-4-hydroxyhydrocinnamide) and so on.

The aforesaid epoxy compounds include, among others, various animal or vegetable oils such as epoxidized soybean oil, epoxidized linseed oil, epoxidized fish oil, epoxidized beef tallow oil, etc., epoxidized fatty acid esters such as epoxidized methyl stearate, epoxidized butyl stearate, etc., epoxidized alicyclic compounds such as epoxidized butyl tetrahydrophthalate, epoxidized octyl tetrahydrophthalate, etc.; glycidyl ethers or esters such as bisphenol A diglycidyl ether, glycidyl methacrylate and its polymer, etc., and epoxy-containing high polymers such as epoxidized polybutadiene, epoxidized acrylonitrilebutadiene rubber and so on.

Formulation

The proportions of the above-mentioned various components based on 100 parts by weight of said halogen-containing thermoplastic resin (A) are as follows:

Metal soap (B): 0.1 to 5 and preferably 0.5 to 4 parts by weight;
Ethylene-vinyl acetate copolymer hydrolysate (C): 0.1 to 5 and preferably 0.2 to 4 parts by weight;
Compound (D): 0.01 to 5 and preferably 0.1 to 3 parts by weight;
Compound (E): 0 to 5, preferably 0.05 to 5, and for still better results, 0.1 to 3 parts by weight;
Compound (F): 0 to 5, preferably 0.01 to 5, and for still better results, 0.01 to 4 parts by weight.

If any of the components (B), (C) and (D) is absent or the proportion of any of these components relative to the component (A) deviates from the above range, the desired degree of improvement in thermal stability will hardly be obtained.

Other additives

In the halogen-containing thermoplastic resin composition of the invention, there may be further incorporated, as necessary, various additives known for incorporation in halogen-containing thermoplastic resin compositions, such as plasticizers, dyes and pigments, fillers, lubricating agents, antistatic agents, surfactants, chelating agents, reinforcing materials, foaming agents, impact resistance improving agents (ethylene-vinyl acetate copolymer, acrylic copolymer, ABS resin, MBS resin, etc.) and so on. It is also possible to incorporate antioxidants, ultraviolet absorbers and other auxiliary stabilizers (e.g. polyols, hydrotalcite compounds of the general formula

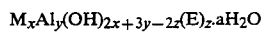

wherein M is Mg, Ca or Zn; E is $CO_3$ or $HPO_3$; x, y and z each is a positive number; a is equal to zero or means a positive number). Furthermore, within limits not contrary to the objects of the invention, other thermoplastic resins may also be incorporated in the halogen-containing thermoplastic resin composition of the invention.

Particularly the addition of a plasticizer is of use. Thus, for example, phthalic acid esters, aliphatic dibasic acid esters, trimellitic acid esters, phosphate esters, fatty acid esters, epoxy plasticizers, polyester type plasticizers, chlorinated paraffin, and the like plasticizers may be added in appropriate proportions relative to halogen-containing thermoplastic resin (A).

Melt-molding

As melt-molding method compatible with the halogen-containing thermoplastic resin composition of the invention, calendering, extrusion molding, injection molding, blow molding and other processes may be mentioned by way of example.

Operation and effects of the Invention

Thus, in accordance with the present invention, the thermal stability (stability against initial coloration, discoloration on aging and blackening) of halogen-containing thermoplastic resin (A) can be markedly improve by addition of said metal soap (B), ethylene-vinyl acetate copolymer hydroylsate (C) and compound (D), preferably together with said compound (E) or (F) or said compounds (E) and (F) at the defined levels. As to the roles played by these additives, the metal soap (B) is supposed to act as a stabilizer and the ethylene-vinyl acetate copolymer hydrolysate (C), compound (D), Compound (E) and compound (F) as auxiliary stabilizers.

The composition of the invention shows no plate-out phenomena during calendering and permits extrusion molding in a long run. Moreover, the resulting moldings are free of discoloration.

Therefore, the present invention is a remarkable contribution to the industry engaged in the molding of polyvinyl chloride and other halogent-containing thermoplastic resins.

EXAMPLES

The following examples are further illustrative of the composition of the invention. In the examples, all 'parts' and '%' are by weight unless otherwise indicated and the water used is invariably deionized water.

Ethylene-vinyl acetate copolymer hydrolysate (C)

Ethylene-vinyl acetate copolymer hydrolysates (C) were prepared as follows:

(C-0)

An ethylene-vinyl acetate copolymer with an ethylene content of 44 mole % was dissolved in methanol to give a 40% solution and 1,000 parts of the solution was fed to a pressure reactor, in which it was heated at 110° C. with stirring. Then, 40 parts of a 6% solution of sodium hydroxide in methanol and 2,500 parts of methanol were continuously fed to the reactor and the hydrolysis reaction was conducted for 2.5 hours, with the byproduct methyl acetate and excess methanol being constantly distilled out from the reaction system. The procedure gave an ethylene-vinyl acetate copolymer hydrolysate with a degree of saponification of the vinyl acetate unit being 99.5 mole %.

After completion of the hydrolysis reaction, 450 parts of 30% aqueous methanol was introduced and the excess methanol was distilled off to give a 39% solution in water-methanol (3:7).

This solution, held at 50° C., was extruded, in the form of strands, through a nozzle (orifice diameter 4 mm) into a water-methanol (9:1) coagulation bath (100 mm wide, 4,000 mm long, 100 mm deep; maintained at 5° C.) at a rate of 1.5 l/hr. After coagulation, the strands were taken up on a roll disposed at one side of the coagulation bath at a linear speed of 2 m/min. and cut with a cutter to give white, porous pellets 4 mm in diameter and 4 mm in length.

The above pellets of ethylene-vinyl acetate copolymer hydrolysate had an ash content of 7,400 ppm and a sodium metal content of 4,800 ppm.

This ethylene-vinyl acetate copolymer hydrolysate is designated as (C-0).

(C-1)

In 300 parts of 0.3 % aqueous acetic acid were immersed 100 parts of the above pellets (C-0) for washing with stirring for 1 hour at 30° C. This procedure (weak acid treatment) was repeated twice. The slurry was then filtered and 300 parts of water were added to the pellets again. The resulting slurry was stirred at 30° C. for 1 hour. This rinse was repeated 3 times and the rinsed pellets were dried.

The above rinsed pellets of ethylene-vinyl acetate copolymer hydrolysate had an ash content of 6 ppm and a sodium metal content of 2.7 ppm.

This ethylene-vinyl acetate copolymer hydrolysate was designated as (C-1).

(C-2)

Prior to the above rinse procedure, the (C-1) pellets washed with weak acid as above were subjected to a strong acid treatment using 230 parts of a 0.003% aqueous solution of phosphoric acid under stirring at 30° C. for 1 hour and, then, subjected to 3 cycles of rinse as in the case of production of (C-1), followed by drying.

The resulting pellets of ethylene-vinyl acetate copolymer hydrolysate had an ash content of 10 ppm and a sodium metal content of 1.4 ppm.

This ethylene-vinyl acetate copolymer hydrolysate was designated as (C-2).

(C-3)

The pellets (C-0) were washed in the same manner as in the preparation of (C-1) but the number of washing cycles was reduced to give pellets of an ethylene-vinyl acetate copolymer hydrolysate with an ash content of 41 ppm and a sodium metal content of 26 ppm. This hydrolysate was designated as (C-3).

(C-4)

The pellets (C-0) mentioned above were washed in the same manner as in the preparation of (C-1) except that the acetic acid concentration of the weak acid bath was reduced to give pellets of an ethylene-vinyl acetate copolymer hydrolysate having an ash content of 240 ppm and a sodium metal content of 170 ppm. This ethylene-vinyl acetate copolymer hydrolysate was designated as (C-4).

(C-5)

To a mixed solution of 1,950 parts of methanol, 925 parts of water, 182 parts of sodium hydroxide and 38 parts of acetone was added 1,124 parts of a suspension-polymerized ethylene-vinyl acetate copolymer (ethylene content 71 mole %, water content 11.0%) and the hydrolysis reaction was conducted at 30° C. for 3 hours and, then, at 35° C. for a further 3 hours, with constant stirring. The resulting slurry was centrifuged.

Then, 100 parts of the copolymer hydrolysate thus separated was mixed with 300 parts of a 1% aqueous solution of acetic acid and stirred at 30° C. for 1 hour. This washing procedure was repeated twice.

The slurry was then filtered and the resulting polymer was immersed in 300 parts of a 0.5% aqueous solution of phosphoric acid and stirred at 30° C. for 1 hour. This strong acid washing procedure was carried out once.

The slurry was then filtered and the resulting resin was mixed with 300 parts of water and stirred at 30° C. for 1 hour. This rinse procedure was repeated 3 times, after which the resin was dried in vacuo at room temperature.

The resulting ethylene-vinyl acetate copolymer hydrolysate has a saponification degree of 61.2 mole %, an ash content of 15 ppm and a sodium metal content of 4.0 ppm.

This ethylene-vinyl acetate copolymer hydrolysate was designated as (C-5).

The assays of ashes and sodium metal were carried out as follows.

(Ashes)

About 80 g of each dried sample was accurately weighed and a portion (about 10 g) was put in a calibrated platinum evaporating dish and carbonized with an electric heater. This procedure was repeated with increments of about 10 g of the sample. Finally, the carbonized sample was incinerated in the flame of a gas burner until smokes ceased to emerge.

The above platinum evaporating dish was placed in an electric furnace at about 400° C. and, with the dish mostly covered up with a porcelain crucible cover, the furnace temperature was gradually increased to 700° C. This temperature was maintained for 3 hours for complete reduction to ashes and the dish was then taken out from the furnace and allowed to cool for 5 minutes. It was further allowed to stand in a desiccator for 25 minutes and the ashes were accurately weighed.

Sodium metal

About 10 g of each dried sample was accurately weighed into a platinum crucible and reduced to ashes in the same manner as above. The plantinum crucible was charged with 2 ml of special reagent grade hydrochloric acid and 3 ml of water and sample was dissolved by heating with an electric heater. Using water, the solution was flushed into a 50 ml measuring flask and water and further added up to the marked line for preparation of a sample for atomic absorption spectrometry.

Using a separately prepared standard solution (sodium metal 1 ppm, HCl approx. 0.5N) as blank, atomic absorption spectrometry was carried out and the amount of sodium metal was estimated from the absorbance ratio. The instrument parameters were as follows:
Instruent: Hitachi Model 180-30 atomic absorption/-flame spectrophotometer
Wavelength: 589.0 nm
Flame: acetylene-air Compound (D)

As examples of compound (D), the following compounds were provided:

(D-1): $Mg_{0.5}Zn_{0.17}Al_{0.33}(OH)_2(CO_3)_{0.165} \cdot 0.45H_2O$ (D-2): $Mg_{0.1}Ca_{0.3}Zn_{0.3}Al_{0.3}(OH)_2 \begin{pmatrix} CHCOO \\ \| \\ CHCOO \end{pmatrix}_{0.15} \cdot 0.41H_2O$ (D-3): $Mg_{0.50}Pd_{0.20}Al_{0.30}(OH)_2(CO_3)_{0.1} \cdot 0.52H_2O$
(D-4): $Mg_{0.50}Zn_{0.20}Al_{0.30}(OH)_2(NO_3)_{0.30}$ As compounds (D') similar to the above compounds (D) but failing to meet the requirements prescribed in accordance with the invention, the following compounds were provided:
(D'-1): $Mg_5Al_2(OH)_{14}CO_3 \cdot 4H_2O$
(D'-1): $Ca_6Al_2(OH)_{16}CO_3 \cdot 4H_2O$
(D'-3): $Zn_6Al_2(OH)_{16}CO_3 \cdot 4H_2O$
(D'-4): $Mg_{0.10}An_{0.60}Al_{0.30}(OH)_2(CO_3)_{0.15} \cdot 0.48H_2O$ cl Compound (E)

As examples of compound (E), the following compounds were provided:
(E-1): 1,4-butanediol bis-β-aminocrotonate
(E-2): dehydroacetic acid
(E-3): diphenyl isodecyl phosphate Compound (F)

As examples of compound (F), the following compounds were provided:
(F-1): tetrakis[methylene-3-(3',5'-di-t-dibutyl-4'-hydroxyphenyl)propionate]methane (Irganox 1010, Ciba-Geigy)
(F-2): bisphenol A diglycidyl ether EXAMPLES 1 to 8; COMPARATIVE EXAMPLES 1 to 9

| | |
|---|---|
| Polyvinyl chloride with a degree of polymerization = 800 (A) | 100 parts |
| Dioctyl phthalate (plasticizer) | 20 parts |
| Calcium stearate (B) | 1 part |
| Zinc stearate (B) | 1 part |
| Ethylene-vinyl acetate copolymer hydrolysate (C), to be specified hereinafter | As mentioned hereinafter |
| Compound (D), to be specified hereinafter | As mentioned hereinafter |
| Compound (E), to be specified hereinafter | As mentioned hereinafter |
| Compound (F), to be specified hereinafter | As mentioned hereinafter |

The above composition was subjected to preliminary mixing and, then, kneading by means of a 6" (dia.)×12" roll at 170° C. for 5 minutes to give a 0.5 mm thick sheet.

From this sheet, a 50×60 mm testpiece was cut out and allowed to stand in a gear oven at 180° C. for testing its thermal stability.

The results are shown in Table 1. The evaluation of thermal stability was made according to the following 9-point schedule:
1: colorless
2: pale pink or pale yellow
3: pale orange
4: light pink
5: light orange
6: yellow-orange
7: orange
8: black spots
9: black

EXAMPLE 1

(C) component: (C-1), 0.5 part
(D) component: (D-1), 0.3 part

EXAMPLE 2

(C) component: (C-1), 0.5 part
(D) component: (D-2), 0.3 part

EXAMPLE 3

(C) component: (C-1), 0.5 part
(D) component: (D-3), 0.3 part

EXAMPLE 4

(C) component: (C-1), 0.5 part
(D) component: (D-4), 0.3 part

EXAMPLE 5

(C) component: (C-1), 0.5 part
(D) component: (D-1), 0.3 part
(F) component: (F-1), 0.1 part

EXAMPLE 6

(C) component: (C-1), 0.5 part
(D) component: (D-4), 0.3 part (E) component: (E-1), 0.3 part
(F) component: (F-1), 0.1 part

EXAMPLE 7

(C) component: (C-1), 0.5 part
(D) component: (D-1), 0.3 part
(E) component: (E-2), 0.3 part
(F) component: (F-1), 0.1 part

EXAMPLE 8

(C) component: (C-1), 0.5 part
(D) component: (D-1), 0.3 part
(E) component: (E-3), 0.3 part
(F) component: (F-2), 0.5 part

COMPARATIVE EXAMPLE 1

(C) component: Not added
(D) component: (D-1), 0.3 part
(E) component: Not added
(F) component: Not added

COMPARATIVE EXAMPLE 2

(C) component: (C-1), 0.5 part
(D) component: Not added
(E) component: Not added
(F) component: Not added

COMPARATIVE EXAMPLE 3

(C) component: Not added
(D) component: Not added
(E) component: (E-1), 0.3 part
(F) component: (F-1), 0.1 part

COMPARATIVE EXAMPLE 4

(C) component: (C-1), 0.5 part
(D') component: (D'-1), 0.3 part
(E) component: Not added
(F) component: Not added

COMPARATIVE EXAMPLE 5

(C) component: (C-1), 0.5 part
(D') component: (D'-2), 0.3 part
(E) component: Not added
(F) component: Not added

COMPARATIVE EXAMPLE 6

(C) component: (C-1), 0.5 part
(D') component: (D'-3), 0.3 part
(E) component: Not added
(F) component: Not added

COMPARATIVE EXAMPLE 7

(C) component: (C-1), 0.5 part (D') component: (D'-4), 0.3 part
(E) component: Not added
(F) component: Not added

COMPARATIVE EXAMPLE 8

(C) component: (C-1), 0.5 part
(D') component: (D'-1), 0.3 part
(E) component: Not added
(F) component: (F-1), 0.1 part

COMPARTIVE EXAMPLE 9

(C) component: (C-1), 0.5 part
(D') component: (D'-4), 0.3 part
(E) component: (E-1), 0.3 part
(F) component: (F-1), 0.1 part

EXAMPLES 9 to 17

Using the following formulas, sheets were manufactured and tested for thermal stability in otherwise the same manner as Examples 1 to 8.

| | |
|---|---|
| Polyvinyl chloride with a degree of polymerization = 800 (A) | 100 parts |
| Dioctyl phthalate (plasticizer) | 20 parts |
| Barium stearate (B) | 1 part |
| Zinc laurate (B) | 1 part |
| Ethylene-vinyl acetate copolymer hydrolysate (C), to be specified hereinafter | As mentioned hereinafter |
| Compound (D), to be specified hereinafter | As mentioned hereinafter |
| Compound (E), to be specified hereinafter | As mentioned hereinafter |
| Compound (F), to be specified hereinafter | As mentioned hereinafter |

The results are also shown in Table 1. The evaluation of thermal stability was made in the same manner as above, using the same 9-point rating schedule.

EXAMPLE 9

(C) component: (C-2), 1.0 part
(D) component: (D-1), 0.4 part
(E) component: Not added
(F) component: Not added

EXAMPLE 10

(C) component: (C-3), 1.0 part
(D) component: (D-1), 0.4 part
(E) component: Not added
(F) component: Not added

EXAMPLE 11

(C) component: (C-4), 1.0 part
(D) component: (D-1), 0.4 part
(E) component: Not added
(F) component: Not added

EXAMPLE 12

(C) component: (C-5), 2.5 parts
(D) component: (D-1), 0.5 part
(E) component: Not added
(F) component: Not added

EXAMPLE 13

(C) component: (C-2), 1.5 parts
(D) component: (D-2), 0.5 part
(E) component: Not added
(F) component: (F-1), 0.05 part

EXAMPLE 14

(C) component: (C-3), 1.5 parts
(D) component: (D-3), 0.5 part
(E) component: (E-1), 0.5 part
(F) component: (F-1), 0.05 part

EXAMPLE 15

(C) component: (C-2), 1.5 parts
(D) component: (D-1), 0.5 part
(E) component: (E-2), 0.5 part (F) component: (F-1), 0.05 part

EXAMPLE 16

(C) component: (C-3), 1.5 parts (D) component: (D-2), 0.5 part
(E) component: (E-3), 0.5 part
(F) component: (F-1), 0.05 part

EXAMPLE 17

(C) component: (C-4), 1.5 parts
(D) component: (D-3), 0.5 part
(E) component: (E-3), 0.5 part
(F) component: (F-2), 0.05 part

EXAMPLE 18

| | |
|---|---|
| Vinylidene chloride-methyl acrylate copolymer (methyl acrylate content 7 mole %) | 100 parts |
| Dioctyl phthalate (plasticizer) | 20 parts |
| Calcium stearate (B) | 1 part |
| Zinc stearate (B) | 2 parts |
| Ethylene-vinyl acetate copolymer hydrolysate (C-1) | 1 part |
| (D-1) | 0.3 part |

The above composition was extruded into a 0.5 mm thick sheet and a testpiece thereof was allowed to stand in a gear oven at 170° C. for testing its thermal stability.

The extrusion-molding conditions were as follows:
Extruder: 40 mm (dia.)
Screw: L/D 23, compression ratio 3.2
Cylinder temperature (max.): 170° C.
Head temperature: 170° C.
Die temperature: 170° C.
The results are also shown in Table 1.

EXAMPLE 19; COMPARATIVE EXAMPLES 10–13

The procedure of Example 18 was repeated except that the formulation was varied as follows. The results are also shown in Table 1.

EXAMPLE 19

(C) component: (C-1), 1.0 part
(D) component: (D-1), 0.3 part
(E) component: (E-1), 0.3 part
(F) component: (F-1), 0.1 part

COMPARATIVE EXAMPLE 10

(C) component: Not added
(D) component: (D-1), 0.3 part
(E) component: Not added
(F) component: Not added

COMPARATIVE EXAMPLE 11

(C) component: (C-1), 1.0 part
(D) component: Not added
(E) component: Not added
(F) component: Not added

COMPARATIVE EXAMPLE 12

(C) component: Not added
(D) component: Not added
(E) component: (E-1), 0.3 part
(F) component: (F-1), 0.1 part

COMPARATIVE EXAMPLE 13

(C) component: (C-1), 1.0 part
(D') component: (D'-1), 0.3 part
(E) component: Not added
(F) component: Not added

EXAMPLE 20

| | |
|---|---|
| Chlorinated polyethylene (Cl content 40%) | 100 parts |
| Dioctyl phthalate (plasticizer) | 20 parts |
| Triazine type vulcanizer | 1 part |
| Mercaptobenzothiazole type accelerator | 2 parts |
| Calcium stearate (B) | 1 part |
| Zinc stearate (B) | 2 parts |
| Ethylene-vinyl acetate copolymer hydrolysate (C-1) | 1 part |
| (D-1) | 0.3 part |

The above composition was molded (roll kneading: 140° C., 5 min.; vulcanization: 160° C., 20 min.) to give a 1 mm thick sheet.

The sheet was allowed to stand in a gear oven at 170° C. for a thermal stability test.

The results are also shown in Table 1.

EXAMPLE 21; COMPARATIVE EXAMPLES 14–17

Using the following formulations, sheets were manufactured in otherwise the same manner as Example 20. The results are also known in Table 1.

EXAMPLE 21

(C) component: (C-1), 1.0 part
(D) component: (D-1), 0.3 part
(E) component: (E-1), 0.3 part
(F) component: (F-1), 0.1 part

COMPARATIVE EXAMPLE 14

(C) component: Not added
(D) component: (D-1), 0.3 part
(E) component: Not added
(F) component: Not added

COMPARATIVE EXAMPLE 15

(C) component: (C-1), 1.0 part
(D) component: Not added
(E) component: Not added
(F) component: Not added

COMPARATIVE EXAMPLE 16

(C) component: Not added
(D) component: Not added
(E) component: (E-1), 0.3 part
(F) component: (F-1), 0.1 part

COMPARATIVE EXAMPLE 17

(C) component: (C-1), 1.0 part
(D') component: (D'-1), 0.3 part
(E) component: Not added
(F) component): Not added.

TABLE 1

| | (Results of evaluation of thermal stability | | | | | | | | | |
|---|---|---|---|---|---|---|---|---|---|---|
| | Time (minutes) | | | | | | | | | |
| | 0 | 10 | 20 | 30 | 40 | 50 | 60 | 80 | 100 | 120 |
| Example 1 | 1–2 | 2 | 2 | 2 | 3 | 3 | 5 | 9 | | |
| Example 2 | 1–2 | 2 | 2 | 2 | 3 | 3 | 5 | 9 | | |
| Example 3 | 1–2 | 2 | 2 | 2 | 3 | 3 | 5 | 9 | | |

TABLE 1-continued

| | (Results of evaluation of thermal stability) | | | | | | | | | |
|---|---|---|---|---|---|---|---|---|---|---|
| | Time (minutes) | | | | | | | | | |
| | 0 | 10 | 20 | 30 | 40 | 50 | 60 | 80 | 100 | 120 |
| Example 4 | 1-2 | 2 | 2 | 2 | 3 | 3 | 5 | 9 | | |
| Example 5 | 1-2 | 2 | 2 | 2 | 3 | 3 | 3 | 5 | 9 | |
| Example 6 | 1 | 1-2 | 1-2 | 2 | 2 | 3 | 3 | 5 | 9 | |
| Example 7 | 1 | 1-2 | 1-2 | 2 | 2 | 3 | 3 | 5 | 9 | |
| Example 8 | 1 | 1-2 | 1-2 | 2 | 2 | 3 | 3 | 5 | 9 | |
| Comparative Example 1 | 1 | 9 | | | | | | | | |
| Comparative Example 2 | 1 | 2 | 3 | 3 | 9 | | | | | |
| Comparative Example 3 | 1 | 2 | 8 | 9 | | | | | | |
| Comparative Example 4 | 4 | 4 | 5 | 5 | 5 | 5 | 6 | 9 | | |
| Comparative Example 5 | 4 | 4 | 5 | 5 | 5 | 5 | 6 | 9 | | |
| Comparative Example 6 | 1-2 | 2 | 3 | 5 | 7 | 9 | | | | |
| Comparative Example 7 | 1-2 | 2 | 3 | 5 | 7 | 9 | | | | |
| Comparative Example 8 | 4 | 4 | 5 | 5 | 5 | 5 | 5 | 7 | 9 | |
| Comparative Example 9 | 1 | 1-2 | 3 | 3 | 6 | 9 | | | | |
| Example 9 | 1-2 | 2 | 2 | 2 | 2 | 3 | 3 | 5 | 8 | 9 |
| Example 10 | 1-2 | 2 | 2 | 3 | 3 | 3 | 3 | 5 | 8 | 9 |
| Example 11 | 2 | 2 | 3 | 3 | 5 | 5 | 5 | 6 | 8 | 9 |
| Example 12 | 1-2 | 2 | 2 | 2 | 2 | 3 | 3 | 5 | 6 | 7 |
| Example 13 | 1-2 | 2 | 2 | 2 | 2 | 2 | 3 | 5 | 6 | 7 |
| Example 14 | 1 | 1-2 | 2 | 2 | 2 | 2 | 3 | 5 | 6 | 7 |
| Example 15 | 1 | 1-2 | 1-2 | 2 | 2 | 2 | 2-3 | 5 | 6 | 7 |
| Example 16 | 1 | 1-2 | 2 | 2 | 2 | 2 | 3 | 5 | 6 | 7 |
| Example 17 | 1-2 | 2 | 2 | 2-3 | 3 | 3 | 3 | 6 | 7 | 7 |
| Example 18 | 1-2 | 1-2 | 2 | 2 | 3 | 3 | 6 | 9 | | |
| Example 19 | 1 | 1 | 1-2 | 2 | 3 | 3 | 5 | 9 | | |
| Comparative Example 10 | 1 | 7-8 | 9 | | | | | | | |
| Comparative Example 11 | 1 | 1-2 | 2 | 3 | 5 | 9 | | | | |
| Comparative Example 12 | 1 | 7 | 9 | | | | | | | |
| Comparative Example 13 | 2 | 3 | 3 | 5 | 5 | 7 | 9 | | | |
| Example 20 | 1 | 1-2 | 2 | 2 | 3 | 3 | 6 | 9 | | |
| Example 21 | 1 | 1 | 2 | 2 | 3 | 3 | 5 | 9 | | |
| Comparative Example 14 | 1 | 7-8 | 9 | | | | | | | |
| Comparative Example 15 | 1 | 1-2 | 2 | 3 | 7 | 9 | | | | |
| Comparative Example 16 | 1 | 7 | 9 | | | | | | | |
| Comparative Example 17 | 2 | 3 | 3 | 3 | 5 | 5 | 7 | 9 | | |

What is claimed is:

1. A halogen-containing thermoplastic resin composition comprising a halogen-comprising thermoplastic resin (A); a metal soad (B) selected from Group II metal salts of higher fatty acids, resin acid and naphthenic acid; an ethylenevinyl acetate copolymer hydrolysate (C) having an ethylene content in the range of 20 to 75 mole percent, a degree of saponification not less than 50 mole percent, an ash content not exceeding 300 ppm and an alkali metal content not exceeding 200 ppm; and a hydrotalcite type solid solution (D) of the general formula

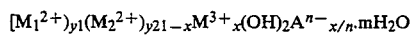

$$[M_1^{2+}]_{y1}(M_2^{2+})_{y2 1-x}M^{3+}{}_x(OH)_2 A^{n-}{}_{x/n} \cdot mH_2O$$

wherein $M_1^{2+}$ is a metal selected from the group consisting of Mg, CA, Sr and Ba, $M_2^{2+}$ is a metal selected from the group consisting of Zn, Cd, Pb and Sn, $M^{3+}$ is a trivalent metal, $A^{n-}$ is an anion having a valence of n and x, y1, y2 and m are positive numbers in the ranges of $0 < x \leq 0.5$, $0.5 < y1 < 1$, $0.5 < y2 < 1$ and $0 \leq m < 2$, respectively, the proportions of (B), (C) and (D) based on 100 parts of weight of (A) being 0.1 to 5 parts by weight, 0.1 to 5 parts by weight and 0.01 to 5 parts by weight, respectively.

2. The composition of claim 1, wherein said halogen-containing thermoplastic resin (A) is a polyvinyl chloride resin.

3. The composition of claim 1, wherein at least a portion of said metal soap (B) is a zinc type metal soap.

4. The composition of claim 1, wherein said ethylenevinyl acetate copolymer hydrolysate (C) has an ash content not exceeding 50 ppm and an alkali metal content not exceeding 35 ppm.

5. The composition of claim 1, wherein said ethylenevinyl acetate copolymer hydrolysate (C) has an ash content not exceeding 20 ppm and an alkali metal content not exceeding 5 ppm.

6. A halogen-containing thermoplastic resin composition comprising a halogen-containing thermoplastic resin (A); a metal soap (B) selected from Group II metal salts of higher fatty acids, resin acid and naphthenic acid; an ethylenevinyl acetate copolymer hydrolysate (C) having an ethylene content in the range of 20 to 75 mole percent, a degree of saponification not less than 50 mole percent, an ash content not exceeding 300 ppm and an alkali metal content not exceeding 200 ppm; a hydrotalcite type solid solution (D) of the general formula $$[M_1{}^{2+})_{y1}(M_2{}^{2+})_{y2}]_{1-x}M^{3+}{}_x(OH)_2A^{n-}{}_{x/n} \cdot mH_2O$$

wherein $M_1{}^{2+}$ is a metal selected from the group consisting of Mg, Ca, Sr and Ba, $M_2{}^{2+}$ is a metal selected from the group consisting of Zn, Cd, Pb and Sn, $M^{3+}$ is a trivalent metal, $A^{n-}$ is an anion having a valence of n and x, y1 and y2 and m are positive numbers in the ranges of $0<x\leq0.5$, $0.5<y1<1$, $0.5<y2<1$ and $0\leq m<2$, respectively; and at least one compound (E) selected from the group consisting of β-diketone compounds, organic phosphorous esters and aminocarboxylic acid compounds, the proportions of (B), (C), (D) and (E) based on 100 parts by weight of (A) being 0.1 to 5 parts by weight, 0.1 to 5 parts by weight, 0.01 to 5 parts by weight and 0.05 to 5 parts by weight, respectively.

7. A halogen-containing thermoplastic resin composition comprising a halogen-containing thermoplastic resin (A); a metal soap (B) selected from Group II metal salts of higher fatty acids, resin acid and naphthenic acid; an ethylenevinyl acetate copolymer hydrolysate (C) having an ethylene content in the range of 20 to 75 mole percent, a degree of saponification not less than 50 mole percent, an ash content not exceeding 300 ppm and an alkali metal content not exceeding 200 ppm; a hydrotalcite type solid solution (D) of the general formula $$[M_1{}^{2+})_{y1}(M_2{}^{2+})_{y2}]_{1-x}M^{3+}{}_x(OH)_2A^{n-}{}_{x/n} \cdot mH_2O$$

wherein $M_1{}^{2+}$ is a metal selected from the group consisting of Mg, Ca, Sr and Ba, $M_2{}^{2+}$ is a metal selected from the group consisting of Zn, Cd, Pb and Sn, $M^{3+}$ is a trivalent metal, $A^{n-}$ is an anion having a valence of n and x, y1 and y2 and m are positive numbers in the range of $0<x\leq0.5$, $0.5<y1<1$, $0.5<y2<1$ and $0\leq m<2$, respectively; and at least one compound (F) selected from the group consisting of phenol derivatives and epoxy compounds, the proportions of (B), (C), (D) and (F) based on 100 parts by weight of (A) being 0.1 to 5 parts by weight, 0.1 to 5 parts by weight, 0.01 to 5 parts by weight and 0.05 to 5 parts by weight, respectively.

8. A halogen-containing thermoplastic resin composition comprising a halogen-containing thermoplastic resin (A); a metal soap (B) selected from Group II metal salts of higher fatty acids, resin acid and naphthenic acid; an ethylenevinyl acetate copolymer hydrolysate (C) having an ethylene content in the range of 20 to 75 mole percent, a degree of saponification not less than 50 mole percent, an ash content not exceeding 300 ppm and an alkali metal content not exceeding 200 ppm; a hydrotalcite type solid solution (D) of the general formula $$[M_1{}^{2+})_{y1}(M_2{}^{2+})_{y2}]_{1-x}M^{3+}{}_x(OH)_2A^{n-}{}_{x/n} \cdot mH_2O$$

wherein $M_1{}^{2+}$ is a metal selected from the group consisting of Mg, Ca, Sr and Ba, $M_2{}^{2+}$ is a metal selected from the group consisting of Zn, Cd, Pb and Sn, $M^{3+}$ is a trivalent metal, $A^{n-}$ is an anion having a valence of n and x, y1 and y2 and m are positive numbers in the ranges of $0<x\leq0.5$, $0.5<y1<1$, $0.5<y2<1$ and $0\leq m<2$, respectively; at least one compound (E) selected from the group consisting of β-diketone compounds, organic phosphorous esters and aminocarboxylic acid compounds; and at least one compound (F) selected from the group consisting of phenol derivatives and epoxy compounds, the proportions of (B), (C), (D), (E) and (F) based on 100 parts by weight of (A) being 0.1 to 5 parts by weight, 0.1 to 5 parts by weight, 0.01 to 5 parts by weight, 0.1 to 5 parts by weight, 0.01 to 5 parts by weight, 0.05 to 5 parts by weight and 0.05 to 5 parts by weight, respectively.

* * * * *

UNITED STATES PATENT AND TRADEMARK OFFICE
CERTIFICATE OF CORRECTION

PATENT NO. : 4,963,608
DATED : October 16, 1990
INVENTOR(S) : Yoshimi AKAMATSU et al.

It is certified that error appears in the above-identified patent and that said Letters Patent is hereby corrected as shown below:

On the cover page, Item [75], before "Makoto Kunieda", insert --Yoshimi Akamatsu, Shigeo Miyata--;

Item [73], "Nippon Gohsei Kagaku Kogyo Kabushiki" should read --Nippon Gohsei Kagaku Kogyo Kabushiki Kaisha--.

Signed and Sealed this

Twelfth Day of May, 1992

Attest:

DOUGLAS B. COMER

*Attesting Officer*     *Acting Commissioner of Patents and Trademarks*